United States Patent [19]

Manson

[11] 4,427,911
[45] Jan. 24, 1984

[54] ROTOR FOR A STEPPER MOTOR HAVING A SHEET METAL SUPPORT FOR THE MAGNET

[75] Inventor: Harry G. Manson, Princeton, Ind.

[73] Assignee: IMC Magnetics Corp., Jericho, N.Y.

[21] Appl. No.: 336,541

[22] Filed: Jan. 4, 1982

[51] Int. Cl.³ .............................................. H02K 21/12
[52] U.S. Cl. ...................................... 310/261; 29/598; 310/42; 310/156
[58] Field of Search ................. 310/42, 153, 156, 265, 310/266, 261; 29/596, 598; 301/5.3, 5.7, 63 R, 105 R

[56] References Cited

U.S. PATENT DOCUMENTS

| | | | |
|---|---|---|---|
| 1,110,360 | 9/1914 | Ware | 301/5.7 |
| 3,482,125 | 12/1969 | Fleckenstein | 310/42 |
| 3,633,055 | 1/1972 | Maier | 310/156 |
| 4,070,592 | 1/1978 | Snowden et al. | 310/49 R |

Primary Examiner—J. D. Miller
Assistant Examiner—D. L. Rebsch
Attorney, Agent, or Firm—Alan H. Levine

[57] ABSTRACT

A rotor includes an annular hub for accommodating a motor shaft, a tubular permanent magnet around the hub and radially spaced from it, and an annular support between the hub and magnet, the support being bonded to the hub and magnet. The support, a single piece of thin sheet metal, has inner and outer tubular walls, joined at corresponding ends by a disc-shaped bridge.

3 Claims, 3 Drawing Figures

ROTOR FOR A STEPPER MOTOR HAVING A SHEET METAL SUPPORT FOR THE MAGNET

This invention relates to stepper motors, such as those illustrated and described in U.S. Pat. Nos. Re. 28,705 (particularly FIGS. 6 and 8) and 3,633,055. More specifically, the invention relates to rotors for such stepper motors.

Such rotors typically comprise a tubular permanent magnet, having a series of north and south poles around its circumference, a shaft within the magnet and extending along the longitudinal centerline of the magnet, and a hub fixed to both the shaft and magnet for permanently joining them together.

These rotors present a number of problems. The hub is usually a machined part which, even though often made of aluminum, adds weight to the rotor. The heavier the rotor, the slower will be its response time to input signals received by the stepper motor. To reduce rotor weight, it has been suggested that the hub be made of plastic; however, in time the plastic hub deforms, destroying the concentricity of the magnet and shaft. Another expedient for reducing weight has been the use of a cap fixed to one end of the magnet for joining the magnet to the shaft. However, since the cap extends longitudinally beyond one end of the magnet, the magnet must be made shorter for any given stepper motor, and shortening the magnet undesirably lowers the torque of the rotor.

Furthermore, the tubular magnets are mady be an extrusion process. As a result, the inner and outer cylindrical surfaces of the magnet are not precisely concentric when formed. Consequently, the magnets must be subjected to an expensiive grinding operation to obtain this concentricity.

It is an object of the present invention to provide a rotor for a stepper motor which has a lower inertia, and hence a faster response time, than conventional rotors without a reduction in torque, and at the same time is less costly to manufacture.

According to the invention, the usual machined hub joining the shaft and magnet is replaced by a much smaller hub and an annular support formed of thin sheet metal, the total weight of the smaller hub and sheet metal support being less than the weight of the single machined hub. Additionally, the annular sheet metal support is sized to be radially spaced from the magnet and/or from the hub which surrounds the shaft. Consequently, when the parts are assembled, there is room to move the hub radially with respect to the magnet, to bring those parts into concentricity, after which the radial space adjacent to the annular support is filled with a bonding material to permanently join the magnet, support, hub, and shaft together.

Other objects and features of the invention will be apparent from the following detailed description, in which reference is made to the accompanying drawings. In the drawings.

Figure 1:
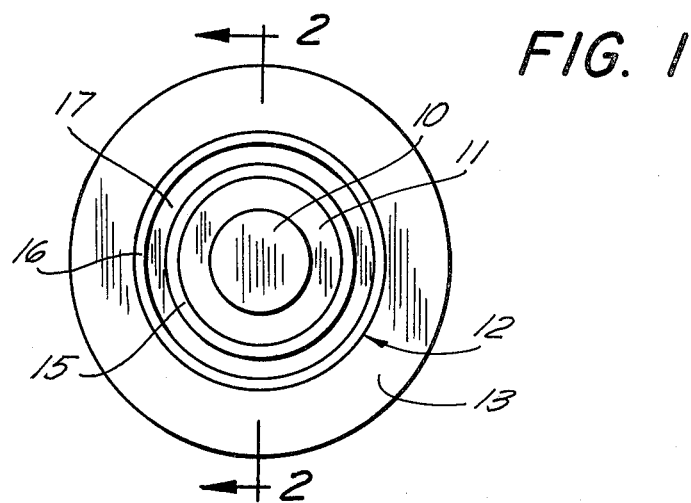
FIG. 1 is an end view of a rotor for a stepper motor, according to the invention, looking in the direction of the arrow in FIG. 2.
Figure 2:
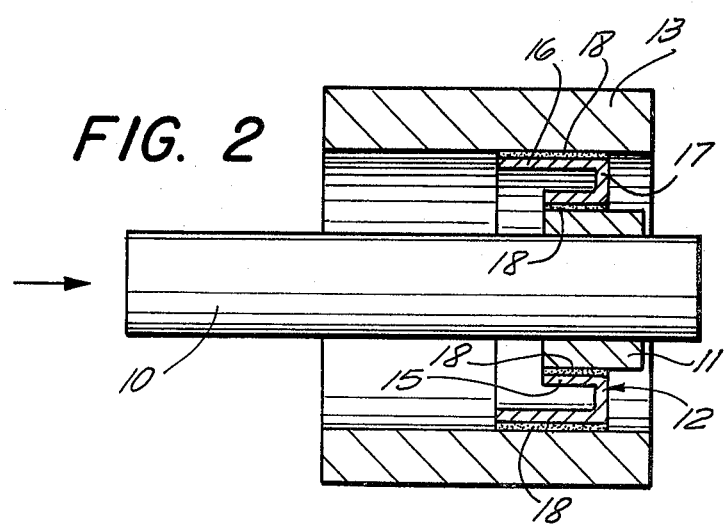
FIG. 2 is a longitudinal cross-sectional view taken along line 2—2 of FIG. 1.
Figure 3:
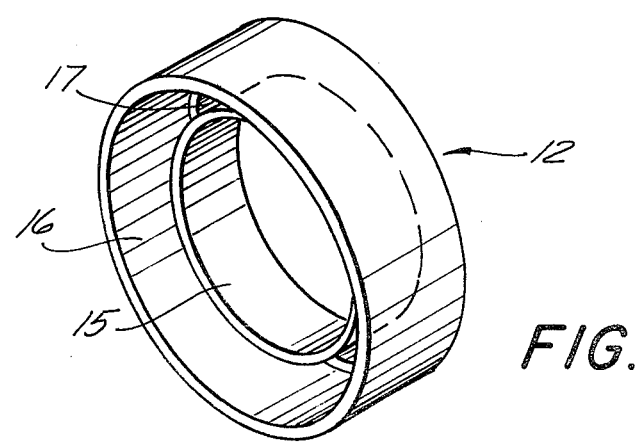
FIG. 3 is a perspective view of the annular support forming part of the rotor.

The rotor chosen to illustrate the present invention comprises a shaft 10, a hub 11 surrounding the shaft, an annular suppot 12 surrounding the hub, and a tubular permanent magnet 13 radially outwardly of the support. Shaft 10, as usual, is adapted to be rotatably supported by a bearing or bearings (not shown) which in turn is carried by a mounting bracket or some other fixed part of the stepper motor.

Hub 11 is a small sleeve which may be a machined or die cast part. The hub is press fit or adhesively bonded on to the shaft. Tubular permanent magnet 13 is conventional, and is provided with a series of north and south poles around its circumference which cooperate with the stator poles of the stepper motor to produce the stepwise rotation of the rotor when the motor windings are energized. Magnet 13 is originally made as a long tubular extrusion, which is then cut into short lengths to provide the magnets 13 for individual rotors.

Annular support 12 is formed from an initially flat piece of thin sheet metal, preferably aluminum, which may be stamped or drawn to provide the shape shown. The support has radially inner and outer concentric walls 15 and 16, respectively, joined at one end by a bridge 17. The walls and bridge are, of course, integrally formed of a single piece of sheet metal. This shape gives support 12 an effective radial width extending from the inner surface of wall 15 to the outer surface of wall 16; however, the support is much lighter than a solid piece of metal having this same dimension. Bridge 17 gives support 12 significant radial strength, despite the thinness of the material of which the support is made.

The radial dimensions of support 12 are so related to the external diameter of hub 11 and the internal diameter of magnet 13 that an appreciable radial spacing exists between (A) the exterior surface of wall 16 and the interior surface of magnet 13, and (B) the interior surface of wall 15 and the exterior surface of hub 11. By "appreciable" spacing is meant a dimension which exceeds the dimension by which the radially interior and exterior surfaces of magnet 13 are out of concentricity. The spaces are filled with a bonding material, such as a suitable adhesive 18 (not indicated in FIG. 1) to permanently bond the magnet 13, support 12, and hub 11 together.

In practice, magnet 13, support 12, and hub 11 (with or without shaft 10 already located within the hub) are arranged in a fixture which assures concentricity between the radially outer surfaces of hub 11 and magnet 13. The radially inner surface of magnet 13 is not necessarily concentric with these two surfaces, due to the nature of the extrusion process by which the magnet is made. However, this is compensated for by the fact that support 12 fits loosely between hub 11 and magnet 13. Hence, any lack of concentricity will be exhibited by non-uniformity of radial spacing between support wall 16 and magnet 13 around the circumference of these two parts, or non-uniformity of radial spacing between support wall 15 and hub 11 around the circumference of these two parts. The radial spacings are then filled with a bonding material 18, which after curing maintains the concentricity between the hub 11 (and hence shaft 10) and the radially outer surface of magnet 13. Note that this concentricity is achieved without the need for machining magnet 13 to make its radially inner and outer surfaces concentric.

Thus, the present rotor is less expensive to manufacture, since magnet 13 does not require machining, and the present rotor is of lighter weight, since the combined weight of hub 11 and support 12 is less than that of a comparable machined hub.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A rotor for a stepper motor, comprising:
   (a) an annular hub having a central opening adapted to accommodate a motor shaft,
   (b) a tubular permanent magnet having an internal diameter larger than the external diameter of the hub, the magnet being located around the hub to define an annular space between the hub and the magnet,
   (c) an annular support within said annular space, the support having a radially outer surface facing the interior surface of the magnet and the support having a radially inner surface facing the exterior surface of the hub, the support outer surface being spaced from the magnet interior surface and the support inner surface being spaced from the hub exterior surface, and the support being a tubular element comprising an annular outer wall, an annular inner wall substantially concentric with the outer wall, and a bridge joining the corresponding ends of the two walls, the two walls and bridge comprising a single piece of thin sheet metal, and
   (d) a bonding material filling the annular gaps between the radially outer and inner surfaces of the support, and the magnet and the hub, respectively.

2. A rotor as defined in claim 1 wherein the bonding means is an adhesive.

3. A rotor as defined in claim 1 wherein the magnet is an extrusion, the internal surface of which is not precisely concentric with the external surface of the magnet.

* * * * *